Sept. 4, 1956   M. MASSAROTTI   2,761,324
AUTOMATIC PRE-SETTING APPARATUS FOR OPERATING CHANGE
SPEED MECHANISM, PARTICULARLY FOR VEHICLES
Filed May 21, 1952   2 Sheets-Sheet 1
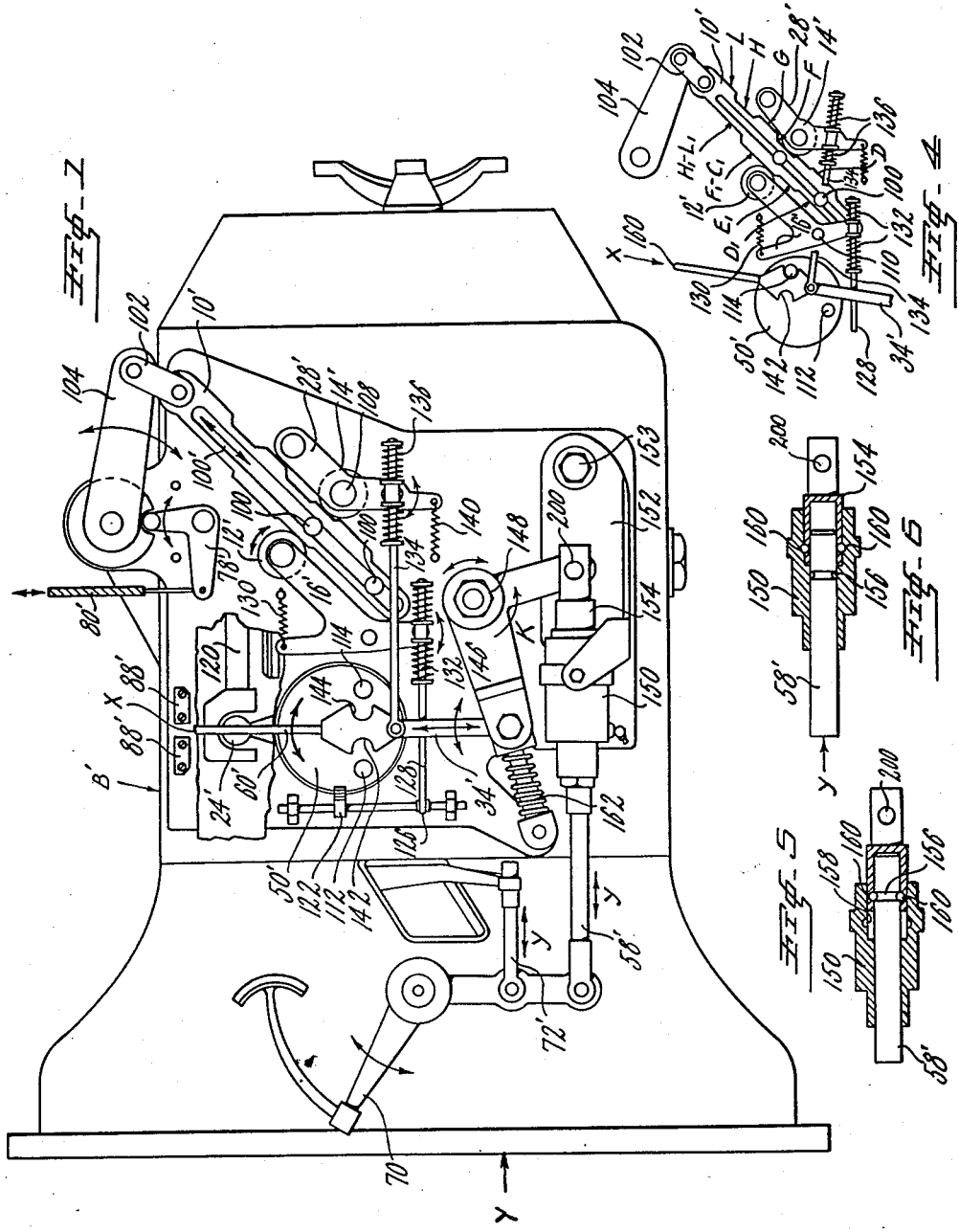
INVENTOR.
MARIO MASSAROTTI
BY Sept. 4, 1956 M. MASSAROTTI 2,761,324
AUTOMATIC PRE-SETTING APPARATUS FOR OPERATING CHANGE
SPEED MECHANISM, PARTICULARLY FOR VEHICLES
Filed May 21, 1952 2 Sheets-Sheet 2

INVENTOR.
MARIO MASSAROTTI
BY

2,761,324
Patented Sept. 4, 1956

2,761,324

AUTOMATIC PRE-SETTING APPARATUS FOR OPERATING CHANGE SPEED MECHANISM, PARTICULARLY FOR VEHICLES

Mario Massarotti, Pavia, Italy

Application May 21, 1952, Serial No. 289,057

Claims priority, application Italy May 21, 1951

8 Claims. (Cl. 74—334)

This invention relates to improvements in or a modification of the subject matter disclosed in U. S. patent application Serial No. 207,184, filed January 22, 1951, in which the proper control in shifting of the various gears of the change speed mechanism is obtained by means of a lever (particularly combined with a friction clutch) determining as a first alternating movement the disengagement of the gear and setting of the following speed, and during the second reciprocating movement the engagement of a pre-set gear couple and the automatic pre-setting to neutral position. According to the present invention the control lever effects disengagement of the couple of the gears in mesh and the engagement of the preset couple with a unique to-and-fro movement.

In the accompanying drawing, in which parts corresponding to those of the U. S. patent application Serial No. 207,184 are given the same reference numerals with the addition of an index.

Figure 1 shows diagrammatically a front elevation view of the mechanism embodying the present invention;

Figure 4 is a detail of the mechanism with 4th speed gear in mesh with 1st speed pre-set, and Figures 5 and 6 are views in section of two positions of the automatic mechanism including a sleeve and sleeve guide connecting the members for engagement with the friction means.

Figure 3:
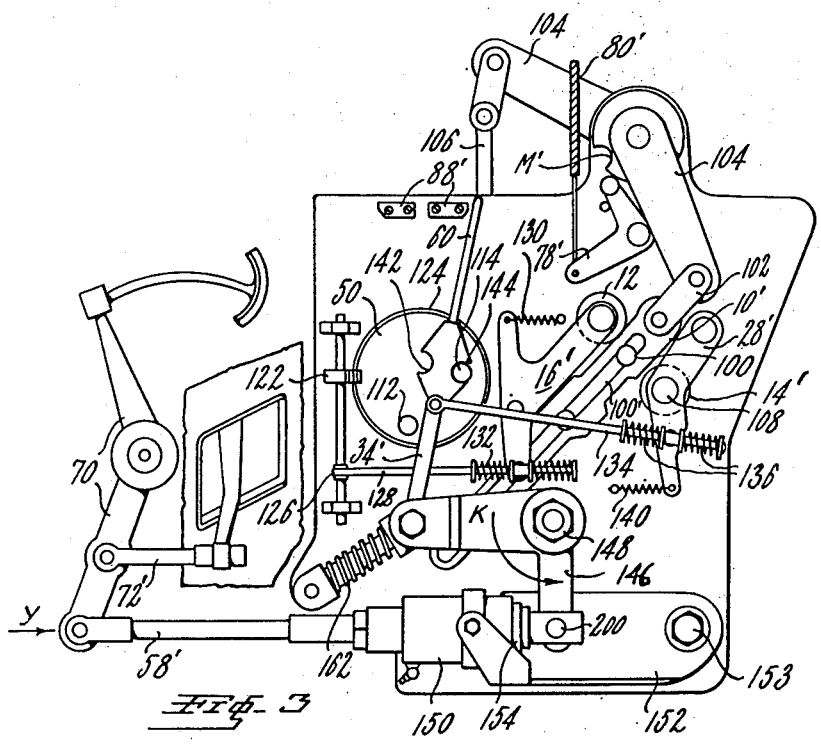
Figure 3 shows the mechanism of Fig. 1 in the position corresponding to 4th speed.

The mechanism shown substantially envisages the construction as disclosed in U. S. patent application Serial No. 207,184 and also the movements of the kinematic devices employed are the same, except as to variations for constructional simplification, in addition to differences derived from reduction of the disengagement control to a single motion disengagement (that is, as a unique alternating movement) with respect to the two motions set forth in the U. S. patent application Serial No. 207,184.

The constructional differences concern chiefly the pre-setting cam 10' which is not of the rotatable type, but of the link type moving in an axial direction (said cam being guided in the axial direction by two pins 100 cooperating with a groove 100' in the cam). The cam 10' is controlled through a link 102, by an oscillating lever 104, on which, by means of a bar 106, acts the governor operated by the transmission means. The bar cam 10' has both its longitudinal sides so shaped that one side cooperates with lever 28' (by the interposition of roller 14'), which is fulcrumed at 108 to the body of the mechanism, while the other side cooperates with lever 16' (with the interposition of roller 12'), said lever being fulcrumed at 110, to the body of the mechanism. The two rollers 14' and 12' are oppositely disposed with respect to the direction of displacement of the bar cam 10'. The various positions assumed by the levers 16' and 28' during the movement of the cam reflect the setting for single speed, similarly to that as disclosed in U. S. patent application Serial No. 207,184.

In fact, in Figure 4, reference character D indicates the position for reverse speed for the lever 28', while $D_1$ represents the position of lever 16', E represents the neutral position for lever 28', while $E_1$ represents the positions of 16', and F the position for first speed for the lever 28' and $F_1$ for lever 16'. Likewise, G and $G_1$, H and $H_1$, L and $L_1$ represent respectively, the position for second, third and fourth speeds for these two levers 28' and 16'.

The pre-setting device is provided in this case also with lever 78' operably by the Bowden control 80' which is used for the manual control of the bar cam 10' setting for the position of neutral, reverse and forward speeds. Lever 78' operates on the peripheral notch M' of a disc fastened to the oscillating lever 104.

Figure 2:
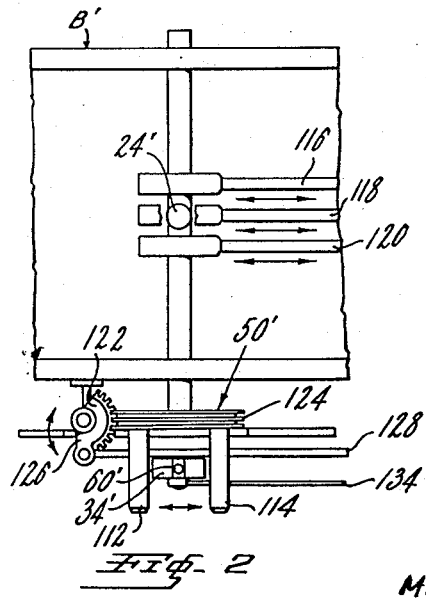
Figure 2 is a partial plan view of Fig. 1.

Disc 50' actuating a lug 24' is fastened directly on a shaft (whilst in the U. S. patent application Serial No. 207,184 a lever and an intermediate arm are provided). Pins on the disc 50' shown in this present application are now reduced to two, 112 and 114, the first related to the control for 1st and 2nd speeds and the second to that of the 3rd and 4th speeds and reverse. The corresponding axially moving arms 116, 118 and 120 operated by the lug 24', which determine in the gear box the engagement of the different speeds are shown in Figure 2, 116 being that relating to 1st and 2nd speed, and 118 to 3rd and 4th speeds, and 120 to reverse.

The shaft carrying lug 24' slides axially to cooperate with one or other of arms 116, 118 and 120. Said axial movement is obtained in the example illustrated, by means of a sector gear 122 cooperating with a rotary rack 124 fixed to the shaft carrying lug 24'. Said rotary rack permits the rotation of the shaft carrying lug 24' without the rotary rack interfering or losing its contact with the sector gear 122. Rotary rack 124 is cut, in the example shown, on the periphery of the disc 50' itself. Sector gear 122 is operated through a radial arm 126 mounted on the shaft to which said sector gear is fastened: the end of said arm 126 is pivotally connected to a rod 128. The latter is connected at its other end to the lever 16' on which acts the cam 10' under influence of a counter-acting spring 130. The connection of the rod 128 with the lever 16' is not of a rigid type since it is effected through two opposed springs 132 that determine a central position for the connection without preventing, within certain limits, relative axial displacements of the rod 128 with respect to the lever 16' in either direction. Such freedom of movement is necessary for the pre-setting movement of the lever 16' (caused by the setting of the bar cam 10') when the rod 128 is at rest on account of a speed gear being engaged (which prevents the axial displacement of the shaft carrying lug 24'). Said freedom of motion is effectively the cause that produces the pre-setting itself, since it determines the loading of one or the other of the two springs 132 so as to act on the sector gear 122 when, the mechanism having been thrown into neutral, there is the possibility of axially displacing the lug 24'. The connection of the rod 134 with the lever 28' through oppositely disposed springs 136 is analogous. Lever 28' is also provided with a spring 140. Rod 134 operates the control element 34' for the rotation of the lug 24'.

The control element 34' is provided with two opposed notches 142 and 144 to engage pins 112 and 114 for rotating disc 50' in one direction or the other according to the direction in which the rods 116, 118 and 120 are axially displaced to ensure the setting of the various speeds. Notches 142 and 144 act, as in U. S. patent application Serial No. 207,184, to push noses 38 and 40, except that these are unidirectional pulling members since the neutral position is obtained by a push action similarly as the one for engagement of the various speeds, whilst notches 144 and 142 are bi-directional pulling members since the neutral condition is obtained through a pull action, oppositely to the push action for engagement of the speeds.

This difference, having been reduced to a single action the operation for changing a speed also reduces the four noses or pins of the disc 50 in the U. S. patent application Serial No. 207,184 to only two, the missing ones being those for disengagement of the automatic pre-setting of the neutral position. The lever 28', acted upon by the cam 10' realises, through the rod 134 three position for element 34' which oscillates around the end of the bell crank 146 fulcrumed at 148 on the body of the mechanism. The middle position (Figures 1 and 2) of the element 34' allows it to freely shift itself in an axial direction without cooperation with the pins 112 and 114. The position at the right (Figures 3 and 4) determines the cooperation of the pin 114 with the notch 144 and therefore the displacement of the disc 50' in clockwise direction when element 34' displaces itself in the direction indicated by arrow X, and in anti-clockwise direction when the element 34' displaces itself in the opposite direction.

A left hand position of the element 34' naturally determines opposite movements.

The three position set for the lever 16' by means of the cam 10' determine the axial position of the lug 24' and therefore the selection as to which of the three rods 116—118—120 the lug 24' is destined to operate when the element 34' is moved.

Moreover the lever 34' is also provided with an extension 60' whose purpose during the movement of the lever 34', is to prevent same from oscillating around its pivot with the lever 146 and therefore its disengagement from the pin 112 or 114 before having attained the transitory position illustrated in Figure 1, that is, the position which corresponds to the instant at which the bell crank 146 is completely rotated to the position shown in Fig. 1. Extension 60' in fact cooperates with fixed stops 88' that constitute the three positions of the axial oscillation of the element 34': the centre position when the extension 60' slides between the two stops 88' and the two side positions when the extension 60' slides laterally to one or the other of the stops 88' (as shown in Figure 3). Thus axial movement of the lever 34' is independent of the action that the lever 28' might tend to transmit through the springs 136. Said action will instead be transmitted only when the extension 60' is disengaged from the stops 88', that is, when the lever 34' is in a downward position after the first move (forward) so as to permit the setting movements.

The movement of the bell crank 146 is, in this case also, transmitted by the pedal lever 70 which operates, through the rod 72', the friction clutch of the vehicle.

The rod 72' acts upon the axially movable rod 58', which slides within a sleeve guide 150, this latter being pivotally connected to a plate 152 which is pivoted at 153 on the body of the mechanism. The sleeve guide 150 can thus follow the movements due to its pivotal connection with the rod 58' and lever 146.

Rod 58' does not directly act on the bell crank 146, but through an axial connection whose movement is limited, being constituted by a sleeve 154, pivoted at point 200 to the bell crank 146 and in which slides the cylindrical end of the rod 58'. The latter has a peripheral groove 156, and another groove 158 is provided inside the cylindrical cavity wherein slides a sleeve 154, provided with radial holes in which are located balls 160 having a diameter larger than the thickness of cylindrical member 154 (Figs. 5, 6).

The operation of the mechanism is as follows: In acting upon the pedal 70 the rods 72' and 58' are shifted in the direction indicated by arrows Y. Rod 72' disconnects the engine from the gear box while rod 58', which initially was in the position shown in Figure 5, now slides freely within the member 154, the balls 160 being contained in the holes of said member and in the groove 158, will therefore prevent any relative movement between the sleeve 154 and the sleeve guide 150. In this way, during the first part of the movement of the friction clutch pedal 70 while the separation of the friction surfaces of the clutch is obtained there is no action upon the gears in the gear change box. On the contrary, continuing to act upon the pedal 70, the rod 58' reaches the bottom of the axial hole of the sleeve 154 and at the same time the groove 156 of the rod 58' comes into registry with the balls 160. In this position the balls 160 can radially move away from the groove 158 into the groove 156, thereupon facilitating disconnection of the sleeve 154 from the sleeve guide 150 and permitting its movement in the direction of the arrow Y, imparted by the rod 58'. Then the lever 156 rotates in the direction indicated by the arrow K displacing the member lever 34' axially, and consequently causing the disc 50' to turn in one direction or the other as the lever 34' cooperates with the pin 112 or 114.

Upon releasing the friction clutch pedal by the action of its spring (not shown) the movements opposite to those just described are obtained; thus the rod 58' moves in a direction opposite to that of the arrow Y and pulls along therewith, by the connection realised by the balls 160 with the sleeve 154 (Figure 5), the bell crank 146 that oscillates in the direction opposite to the arrow K. The lever 34' therefore moves axially in the direction opposite to the arrow X causing (if its position of pre-setting is not that at midway or "neutral" position as Figure 1 indicates) the further rotation of the disc 50' one way or the other following the orientation of the member 34' due to the pre-setting of the lever 28'. At the end of this action the rod 58' is located with its groove 156 facing the groove 158 and therefore the balls 160 penetrate into the latter and secure the sleeve 154 to the sleeve guide 150 (thereby the control lever 146 stops) and disconnect the rod 58' from the sleeve 154. Rod 58' then continues its movement in the direction, opposite to the arrow Y allowing the rod 72' again to connect the engine with the friction clutch.

The operation is, therefore, accomplished by a single forward and backward movement of the friction clutch pedal. It should be clear from what has been hitherto described that "pushing" upon the friction clutch pedal disconnects the speed then engaged and puts the gear in "neutral," while "the return" of said pedal causes the engagement of the speed that happens to be pre-set by the levers 16' and 28' as preset by the manually operable Bowden control.

In order to enhance the limited effect of the friction clutch springs, especially in the position of the clutch engaged, an auxiliary spring 162 is provided for acting on the lever 146. Spring 162 is of the spiral type and its orientation is such that the effort transmitted is directed along the pivotal axis of the lever 146 when the pedal is completely pressed down. In this position, in fact, there is no useful couple effect into the lever 146 due to the spring 162, while its effect increases as the lever 146 rotates more and more in the direction opposite to K, that is, while at the same time the effect of the friction clutch springs grows less and less. Friction clutch springs and the spring 162 cooperate therefore with opposite effects so as to ensure the return of the pedal 70 effectively at all times since said pedal is relied upon for engaging the pre-set speed.

Figure 1 illustrates the position of the mechanism in "neutral" (lever 78' being at the centre) that is with the levers 16' and 28' in the position of presetting for "neutral" (the lever 34' being at the middle as is also sector gear 122, notwithstanding the fact that for the "neutral" position the sector gear 122 may be in any position).

In Figure 1 the pedal 70 is pressed down, that is, it has performed the first part of its movement (forward movement disengaged any speed that was previously engaged. If the pedal 70 is released it returns to its initial position as before mentioned, engaging the friction clutch and moving the lever 34' in the direction opposite to the arrow X. On the other hand the lever 34' does not cause the engagement of any speed as it is in the centre "neutral" position.

Figure 3 shows the mechanism in the position of 4th speed: said speed, is the pre-set as well as the engaged speed and this is evident by the position of the cam 10', and therefore, by the fact that the spring 132 and 136 are equally loaded, viz. the connection between the rods and levers in its mean equilibrium position (the same condition appears in Figure 1). If the pedal 70 be acted upon in its forward movement it would disengage the 4th speed and displace the "neutral," while in its return movement it would again engage the 4th speed, that is the one pre-set, carrying the mechanism again to the position shown (Figure 3).

In Figure 4 the 4th speed is engaged as in the example of Figure 3 (and this is evident by the position of the disc 50', and can also be presumed from the position of the toothed sector 122 which is not visible in the figure), but the pre-set speed is 1st speed (as is evident from the position of the cam 10'). For this reason the rods 128, and 134 are not connected to the levers 16' and 28' in the mean equilibrium position of the springs 132 and 136, but on the contrary are in a displaced position, so that one of the springs of each of said couples is under load and can, therefore, when the rods 128 and 134 are freed to move, carry them to the right position that determines the presetting of the 1st speed. This happens at the end of the forward movement of the pedal 70, that is, when the member 34' has moved in the direction of the arrow X for disengaging the 4th speed, viz. by causing the disc 50' to rotate clockwise until it has reached the position shown in Figure 1, and when the extension 60' has freed itself from the fixed stop 88'.

At this point the sector gear 122 and the lever 34' orient themselves according to the pre-set speed which, in the example of Figure 1 is first speed, and the return of the pedal 70 firstly leads to the engagement of first speed and then to the engagement of the friction clutch as before mentioned.

It is understood, of course, that the constructional details of the mechanism and its practical uses may vary. For instance, the mechanism may undergo changes depending upon the particular type of speed box to which it is to be applied. The example described relates to a common speed box for automotive vehicles having four forward speeds and one reverse. The movement of the lever 70 can, naturally, also be obtained automatically, for instance, through a servo-motor driven by the speed pre-setting means.

Having thus described the invention, what is claimed as new and desired to be secured by Letters Patent, is:

1. In an engine-driven vehicle including pedal-controlled clutch means, and gear transmission mechanism; controlling means for operating said transmission mechanism and cooperating with said clutch means, said controlling means for operating said transmission mechanism including a bar cam having camming surfaces formed on opposing edges thereof, bar cam locating means for positioning said bar cam, pivotally mounted first and second camming means for slidable engagement with said camming surfaces, a disc mounted for axial and rotary movement and having means connected for movement in response, respectively, to movement of said first and second camming means, presetting means moving in response to movement of said first camming means for selecting the gears to be meshed in said transmission mechanism, gear meshing means moving in response to movement of said second camming means for meshing the selected gears determined by said presetting means, and movable means for interconnecting said gear meshing means with said pedal of said clutch means.

2. In a vehicle as set forth in claim 1, wherein said camming surfaces formed on said bar cam are predetermined to control forward or rearward motion of the vehicle as selected by operations of said bar cam locating means.

3. In a vehicle as set forth in claim 2, wherein the surfaces formed on said bar cam are predetermined to control the forward motion of the vehicle in preselected steps.

4. In a vehicle as set forth in claim 1, wherein said disc mounted for axial and rotary movement in response to said first and second camming means, is interconnected to said camming means by rods each having equalizing means thereon.

5. In a vehicle as set forth in claim 1, wherein said disc which is mounted for axial and rotary movement has presetting means for providing such axial movement, said presetting means including a rotary rack formed on said disc, an axially movable shaft carried by said disc, and a sector gear in engagement with said rotary rack responsive to said first camming means for axial movement of said disc.

6. In a vehicle as set forth in claim 1, wherein said disc which is mounted for axial and rotary movement carries said gear meshing means for providing such rotary movement, said gear meshing means including laterally disposed pins on said disc for rotating same, a disc pin lever for engaging said laterally disposed pins, and means connected to said lever moving in response to movement of said second camming means for positioning said lever for engagement with one or the other of said laterally disposed pins.

7. In a vehicle as set forth in claim 6, said movable means for interconnecting said gear meshing means with said clutch and driving means, including a bell crank connected to said disc pin lever.

8. In a vehicle as set forth in claim 6, wherein a bell crank is connected to said disc pin lever, said movable means for interconnecting said gear meshing means with said pedal of said clutch means including a coupling, to the end that said coupling will disengage the clutch means before the gear meshing means can be operated.

References Cited in the file of this patent

UNITED STATES PATENTS

| | | |
|---|---|---|
| 2,429,160 | Helmstein et al. | Oct. 14, 1947 |
| 2,572,054 | Randol | Oct. 23, 1951 |
| 2,610,521 | Randol | Sept. 16, 1952 |